E. F. HAPPENSACK.
CASTER SHIELD.
APPLICATION FILED JULY 12, 1918.

1,285,142.

Patented Nov. 19, 1918.

Inventor—
Edward F. Happensack
By Walter F. Murray,
Attorney.

E. F. HAPPENSACK.
CASTER SHIELD.
APPLICATION FILED JULY 12, 1918.

1,285,142.

Patented Nov. 19, 1918.

Inventor—
Edward F. Happensack
By Walter F. Murray
Attorney.

UNITED STATES PATENT OFFICE.

EDWARD F. HAPPENSACK, OF CINCINNATI, OHIO, ASSIGNOR TO THE O. P. SCHRIVER COMPANY, OF CINCINNATI, OHIO, A CORPORATION OF OHIO.

CASTER-SHIELD.

1,285,142.

Specification of Letters Patent.

Patented Nov. 19, 1918.

Application filed July 12, 1918. Serial No. 244,528.

*To all whom it may concern:*

Be it known that I, EDWARD F. HAPPENSACK, a citizen of the United States of America, and resident of Cincinnati, in the county of Hamilton and State of Ohio, have invented a new and useful Improvement in Caster-Shields, of which the following is a specification.

An object of my invention is to produce an improved caster shield for preventing threads, dirt, shavings, etc., from becoming wound around or getting into the axle of the caster.

This and other objects are attained in the shield described in the following specification and illustrated in the accompanying drawing, in which.

Figure 1:
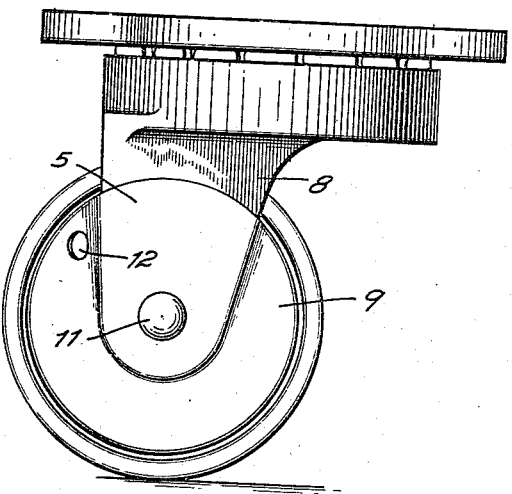
Figure 1 is a side elevation of a caster equipped with a shield embodying my invention.
Figure 2:
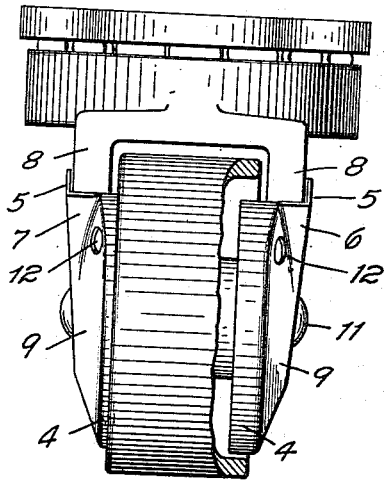
Fig. 2 is an end elevation of the caster shown in Fig. 1.
Figure 3:
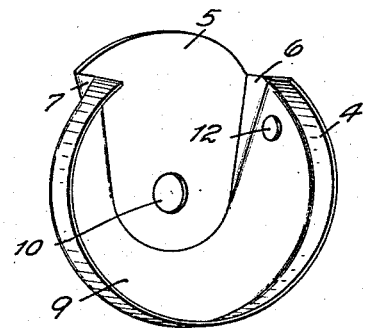
Fig. 3 is an interior perspective view of a shield embodying my invention.
Figure 1:
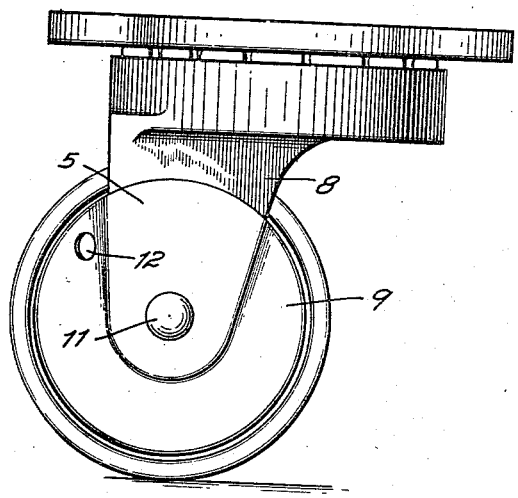
Figure 2:
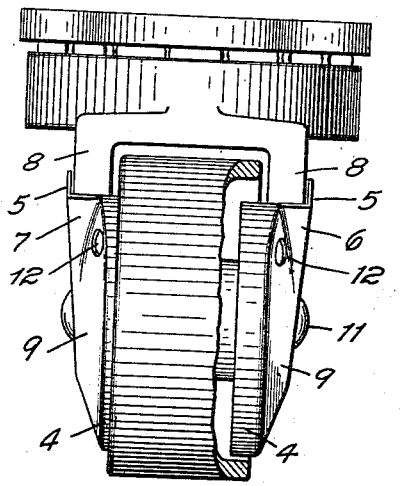
Figure 3:
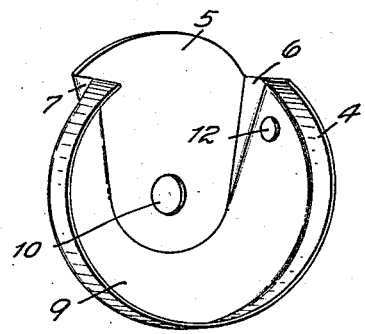

My improved shield is pressed into shape from sheet metal, being circular in shape as shown in Fig. 1. A substantially annular flange 4 is formed upon the periphery of the shield to fit and extend within the rim of the caster wheel as shown in Figs. 1 and 2. The flange terminates upon each side of the caster support to which it is fitted, adjacent to an offset portion 5 which has sides 6 and 7 adapted to engage the edges of the legs 8 of the caster support. The offset portion is pressed from a central and somewhat frusto-conically shaped portion 9 of the shield. In the center of the shield an opening 10 through which the axle 11 of the caster is passed, is formed, an opening 12 being formed in the frusto-conical portion for oiling the caster wheel bearing.

A shield embodying my invention is located on each side of the caster wheel with the offset portion 5 in engagement with the outer face of each leg 8 of the caster frame and the sides 6 and 7 in engagement with the edges of the caster leg, as shown in Figs. 1 and 2.

One feature of novelty of my improved shield is the close fitting position of the flange 4 within the rim of the caster wheel; and the distance the flange extends within the rim. Another feature is the close fitting engagement of the sides 6 and 7 with the legs 8. An additional feature is the frusto-conical shape of the central portion 9.

An advantage attained by the close fitting position of flange 4 within the caster wheel is that the entrance of dirt to the interior of the caster is prevented, the flange keeping out all threads, dust, shavings, etc., which would become wrapped around the axle. This advantage is further increased by the frusto-conical shape of the central portion 9, which causes all threads to be guided away from the shield, thus assisting in preventing their becoming entangled with or wrapped around the wheel.

The close fitting engagement of the sides 6 and 7 of the offset portion 5 with the edges of the legs 8 of the caster frame, so stiffens the shield and guides it that displacement is positively prevented, the concentric alinement of the flange 4 with the rim of the wheel being positively maintained.

Having thus described my invention, what I claim is:

1. In combination with a caster, a caster shield consisting of a central portion having a flange extending therefrom and adapted to enter beneath the rim of the caster wheel adjacent to the inner edge thereof, an offset portion adapted to engage a leg of the caster, and means adapted to secure the shield to the leg.

2. A caster shield consisting of a central portion having a flange extending therefrom, said portion being of frusto-conical shape extending in a direction opposite to that of the flange, and an offset from the central portion adapted to engage and be secured to the frame of a caster.

In testimony whereof, I have hereunto subscribed my name this 9th day of July, 1918.

EDWARD F. HAPPENSACK.

Witnesses:
J. M. WEBSTER,
W. THORNTON BOGERT.